United States Patent [19]
Link

[11] Patent Number: 4,970,767
[45] Date of Patent: Nov. 20, 1990

[54] HEATABLE CONTROLLED DEFLECTION ROLL

[75] Inventor: Christoph Link, Weingarten, Fed. Rep. of Germany

[73] Assignee: Sulzer-Escher Wyss Limited, Zurich, Switzerland

[21] Appl. No.: 345,238

[22] Filed: May 1, 1989

[30] Foreign Application Priority Data

May 6, 1988 [CH] Switzerland ............ 01741/88

[51] Int. Cl.$^5$ .............................. B21B 13/02
[52] U.S. Cl. .................... 29/116.2; 29/116.1; 29/113.2; 384/99; 100/162 B
[58] Field of Search ............ 29/113.1, 113.2, 116.1, 29/116.2; 384/99, 100; 100/162 B, 170

[56] References Cited

U.S. PATENT DOCUMENTS 3,997,953 12/1976 Christ et al.
4,282,639 8/1981 Christ et al.
4,726,691 2/1988 Lehmann.
4,757,584 7/1988 Pau et al. .................... 29/116.2

FOREIGN PATENT DOCUMENTS 577598 7/1976 Switzerland.

Primary Examiner—Joseph M. Gorski
Assistant Examiner—S. Thomas Hughes
Attorney, Agent, or Firm—Werner W. Kleeman

[57] ABSTRACT

A heatable controlled deflection roll contains hydrostatic support elements, each of which is supported in a pressure chamber and displaceable in a predetermined support or pressing direction. Heating of the rotatable roll shell or jacket of the controlled deflection roll is accomplished by infeeding a heated hydraulic heat carrier medium to bearing pockets of the hydrostatic support elements. This infeed of the heated hydraulic heat carrier medium is effected operationally separate from the provision of the pressure chamber with hydraulic pressurized fluid medium colder than the heated hydraulic heat carrier medium. The infeed of the hydraulic heat carrier medium and the infeed of the hydraulic pressurized fluid medium are thus accomplished via separate lines without thermal stressing of associated regulating valves and pumps and without a viscosity reduction of the hydraulic pressurized fluid medium, such viscosity reduction resulting in a loss of hydraulic pressurized fluid medium. In one embodiment of the hydrostatic support elements there are provided cavities which can be supplied with the hydraulic heat carrier medium separate from the infeed of the hydraulic pressurized fluid medium. In another embodiment of the hydrostatic support elements the infeed of hydraulic heat carrier medium is accomplished through the pressure chamber by a tubular-shaped sleeve sealingly displaceable relative to the pressure chamber.

2 Claims, 1 Drawing Sheet

HEATABLE CONTROLLED DEFLECTION ROLL

BACKGROUND OF THE INVENTION

The present invention broadly relates to a controlled deflection roll or sag-compensating roll having hydrostatic support or pressure or carrier elements and, more specifically pertains to a new and improved construction of a heatable controlled deflection roll.

Generally speaking, the controlled deflection roll of the present invention comprises a stationary support or beam and a roll shell or jacket which is rotatable about the stationary support or beam. The rotatable roll shell or jacket is supported or braced in relation to the stationary support or beam by means of at least one hydrostatic support or carrier or pressure element. This at least one hydrostatic support or carrier or pressure element is displaceable in a pressure space or chamber in radial direction with respect to the stationary support or beam. First supply means are provided for the infeed of a hydraulic pressurized fluid medium to the pressure space or chamber. Furthermore, the at least one hydrostatic support or carrier or pressure element comprises a running surface for the rotatable roll shell or jacket, which running surface faces or confronts the inner side of the rotatable roll shell or jacket and at which running surface there is provided at least one hydrostatic bearing or stabilizing pocket. Second supply means are provided for the infeed of a hydraulic heat carrier medium to the at least one hydrostatic bearing or stabilizing pocket provided at the running surface of the at least one hydrostatic support or carrier or pressure element.

Such heatable or heated controlled deflection rolls, also known in the art as rolls with bending or sag compensation, are known, for example, from Swiss Patent No. 577,598 published July 15, 1976 and U.S. Pat. No. 4,282,639, granted Aug. 11, 1981 and are used, for instance, in smoothing calenders for treating paper webs and setting non-woven fabrics and in plastic material and elastomer calenders for pressure treatment of corresponding material webs at elevated temperatures.

In the controlled deflection roll disclosed in the aforementioned Swiss Patent No. 577,598 the hydrostatic bearing or stabilizing pockets of the hydrostatic support or pressure elements are connected with the pressure chamber of the associated hydrostatic support or pressure element by means of throttle bores or throttle passages. The hydrostatic bearing or stabilizing pockets are thus provided via the pressure chamber with the same hydraulic pressurized fluid medium which serves to generate the pressing force of the hydrostatic support or pressure element by way of the pressure chamber as well as to hydrostatically mount or support the tubular-shaped roll shell or jacket by means of the hydrostatic bearing or stabilizing pockets. For the purpose of heating the tubular-shaped roll shell or jacket, the hydraulic pressurized fluid medium can be heated to the required temperature prior to being supplied to the pressure chambers. In this manner, the tubular-shaped roll shell or jacket of a controlled deflection roll can be heated from within by means of only one single supply of hydraulic pressurized fluid medium to the individual hydrostatic support or pressure elements. However, this is disadvantageous in that the components or devices required for the supply of the hydraulic pressurized fluid medium, for example, pumps, valves or other control units, have to endure the necessarily high temperatures far above 100° C., which temperatures they often cannot withstand. Furthermore, the normally used hydraulic pressurized fluid media, for instance pressure oils, assume such a low viscosity and thus become highly fluid at the required high temperatures, that undesired high leakage occurs.

To avoid the aforesaid disadvantage or shortcoming, efforts have been made to separate the heating of the inner side of the rotatable roll shell or jacket from the supporting, pressing or stabilizing function of the hydrostatic support or pressure element.

It is known, for example, from U.S. Pat. No. 3,997,953, granted Dec. 21, 1976, to provide additional heat-control devices arranged in a row which extends in parallel relationship to the roll axis and is substantially remote from the hydrostatic support or pressure elements. Such heat-control devices guided in the manner of a piston in a borehole or bore are supplied with a heat-control liquid vehicle, while the actual hydrostatic support or pressure elements are supplied with a pressurized fluid medium at a normal temperature.

A controlled deflection roll disclosed, for example, in U.S. Pat. No. 4,282,638, granted Aug. 11, 1981, is equipped with spraying devices arranged in the intermediate space between the stationary support or beam and the rotatable roll shell or jacket. These spraying devices have walls facing the inner surface or side of the rotatable roll shell or jacket. At these walls there are formed openings which, during operation, form liquid jets or streams which impact against the inner surface or side of the rotatable roll shell or jacket. The disadvantage of such heat transfer between the heated oil and the rotatable roll shell or jacket is seen in the fact that additional components and installations are required within the controlled deflection roll and that such components and installations take up space which is often not available, particularly in controlled deflection rolls for high pressing forces, such rolls requiring an especially stable and rigid stationary support or beam.

It is of course known, for example, from U.S. Pat. No. 4,726,691, granted Feb. 23, 1988 to separately supply the pressure chambers and the bearing or stabilizing pockets of a controlled deflection roll with hydraulic pressurized fluid medium. However, the same hydraulic pressurized fluid medium, typically pressure oil, and the same bearing pump are used to supply the pressure oil to the separate delivery or feed lines. Moreover, no heating and thus no heat control liquid vehicle is provided. Even if the hydraulic pressurized fluid medium were heated as known to the art for the purpose of heating the rotatable roll shell or jacket, the same problems, as described hereinbefore, would arise with respect to the sensitiveness to heat of the components as well as of the pressure oil.

SUMMARY OF THE INVENTION

Therefore with the foregoing in mind, it is a primary object of the present invention to provide a new and improved construction of a heatable controlled deflection roll which does not exhibit the aforementioned drawbacks and shortcomings of the prior art.

A further significant and more specific object of the present invention aims at the provision of a new and improved construction of a heatable controlled deflection roll which is heated from within or from the inside and in which the heat-sensitive components of the hydraulic pressurized fluid medium supply are not influenced or impaired by the heating of the rotatable roll shell or jacket and are not exposed to higher temperatures, whereby no supplementary or additional space-consuming components or installations are required at the stationary support or beam or in the intermediate space between the stationary support or beam and the rotatable roll shell or jacket.

Yet a further significant object of the present invention aims at providing a new and improved controlled deflection roll which is relatively simple in construction and design, extremely economical to manufacture, highly reliable in operation, not readily subject to malfunction and requires a minimum of maintenance and service.

Now in order to implement these and still further objects of the invention which will become more readily apparent as the description proceeds, the heatable controlled deflection roll of the present invention is manifested, among other things, by the features that the first supply means for infeeding the hydraulic pressurized fluid medium to the pressure space or chamber and the second supply means for infeeding the hydraulic heat carrier medium to the at least one hydrostatic bearing or stabilizing pocket are operationally separate from one another and that heating means are provided for the second supply means for infeeding the hydraulic heat carrier medium, such heating means serving to bring the hydraulic heat carrier medium to a temperature which is higher than a predetermined operating temperature of the hydraulic pressurized fluid medium.

By virtue of the operational separation of the hydraulic circuits for the pressure spaces or chambers and the hydrostatic bearing or stabilizing pockets, respectively, it is no longer necessary to heat all of the hydraulic pressurized fluid medium for the purpose of heating the rotatable roll shell or jacket. It is quite sufficient to only heat the hydraulic heat carrier medium to the predetermined required temperature, while the hydraulic pressurized fluid medium used for generating the pressing force remains at the predetermined operating or normal temperature thereof. In this manner, the components of the pressure supply installations and of the pressure control devices are not, or then only to a small extent, influenced or affected by the hydraulic heat carrier medium. The hydraulic heat carrier medium simultaneously serves to mount and support the rotatable roll shell or jacket at higher temperatures.

In principle, the same hydraulic pressurized fluid medium, for instance a pressure oil, can in fact be used for both operationally separate hydraulic circuits. This would be advantageous in that no additional or supplementary bores for the supply of the hydraulic pressurized fluid medium would have to be provided in the stationary support or beam, provided that adequate heating devices are arranged at the individual supply lines or conduits for infeeding heated hydraulic pressurized fluid medium to the hydrostatic bearing or stabilizing pockets. Such heating devices can be constructed to be individually controllable.

However, it can be particularly advantageous to provide different hydraulic media for the two operationally separate hydraulic circuits, so that the hydraulic heat carrier medium does not possess the same composition as the hydraulic pressurized fluid medium which is fed to the pressure spaces or chambers.

Such different hydraulic fluid media are optimally adapted, in general, to the respective operating conditions in the two operationally separate hydraulic circuits and, in particular, to the operating temperatures with respect to stability and viscosity of such hydraulic fluid media. For example, a low-temperature oil can be selected for the hydraulic pressurized fluid medium, whereas a special high-temperature oil can be used as the heating means or the hydraulic heat carrier medium. In such a case, it is advantageous when both hydraulic fluid media are substantially compatible with each other. In other words, they should be able to mix or blend in order to avoid operating trouble or even breakdown.

Means for heating the hydraulic heat carrier medium can be provided within or on the inside of the heatable controlled deflection roll and, for example, can comprise superheated steam lines or conduits, electrical resistance heating elements or induction coils. However, the heating device can be also arranged externally of the heatable controlled deflection roll, the hydraulic heat carrier medium being supplied, separate from the hydraulic pressurized fluid medium, to the respective hydrostatic bearing or stabilizing pockets via separate bores or lines provided in the stationary support or beam. In this manner, only one or a number of additional bores or lines in the stationary support or beam would be required, without taking up additional space within or on the inside of the heatable controlled deflection roll.

In an advantageous development of the invention, the first supply means comprise conduit means to infeed the hydraulic pressurized fluid medium from first container means and via a first pump device and regulating valve means to the at least one pressure space or chamber. Pressure limiting valve means are advantageously arranged parallel to the first pump device. The second supply means comprise conduit means to infeed the hydraulic heat carrier medium from second container means and via a second pump device and the heating means to the at least one hydrostatic bearing or stabilizing pocket. Pressure limiting valve means are advantageously arranged parallel to the second pump device.

In an advantageous further development of the invention, the hydraulic heat carrier medium possesses the same composition as the hydraulic pressurized fluid medium, so that a common hydraulic pressurized fluid medium for the operationally separate first and second supply means is provided from common container means via a common pump device. On the other hand, first conduit means are provided for infeeding the common hydraulic pressurized fluid medium via pressure regulating valve means to the at least one pressure space or chamber. On the other hand, second conduit means are provided for infeeding the common hydraulic pressurized fluid medium via the heating means to the at least one hydrostatic bearing or stabilizing pocket of the at least one hydrostatic support or carrier or pressure element.

Check-valve means are advantageously arranged at the second conduit means for supplying the common hydraulic pressurized fluid medium to the at least one hydrostatic bearing or stabilizing pocket. Such check-valve means serve to shut off the flow of the common hydraulic pressurized fluid medium to the at least one hydrostatic bearing or stabilizing pocket as soon as the rotational speed of the rotatable roll shell or jacket exceeds a predetermined threshold rotational speed thereof.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 3 shows a portion or segment of the heatable controlled deflection roll shown in FIG. 1, and a schematic illustration of supply lines or conduits leading from a common container or reservoir and via a common pump circuit to two operationally separate hydraulic circuits;

FIG. 4 is a schematic sectional view of the construction of a first embodiment of a hydrostatic support or carrier or pressure element and an associated pressure space or chamber located in a portion or segment of the heatable controlled deflection roll shown in FIG. 1, on a slightly enlarged scale;

FIG. 5 is a schematic sectional view of the construction of a second embodiment of a support or carrier or pressure element and an associated pressure space or chamber located in a portion or segment of the heatable controlled deflection roll shown in FIG. 1, on a slightly enlarged scale;

FIG. 6 is a schematic sectional view of a heatable controlled deflection roll constructed according to the invention, taken along a substantially perpendicular plane to the roll axis and showing separate supply line or conduit means for a hydraulic pressurized fluid medium and a hydraulic heat carrier medium, respectively; and FIG. 7 is a schematic top plan view of the supply line or conduit means for infeeding the hydraulic heat carrier medium to a plurality of adjacently arranged hydrostatic support or carrier or pressure elements.

DETAILED DESCRIPTION OF THE PREFERRED EMBODIMENTS

Figure 1:
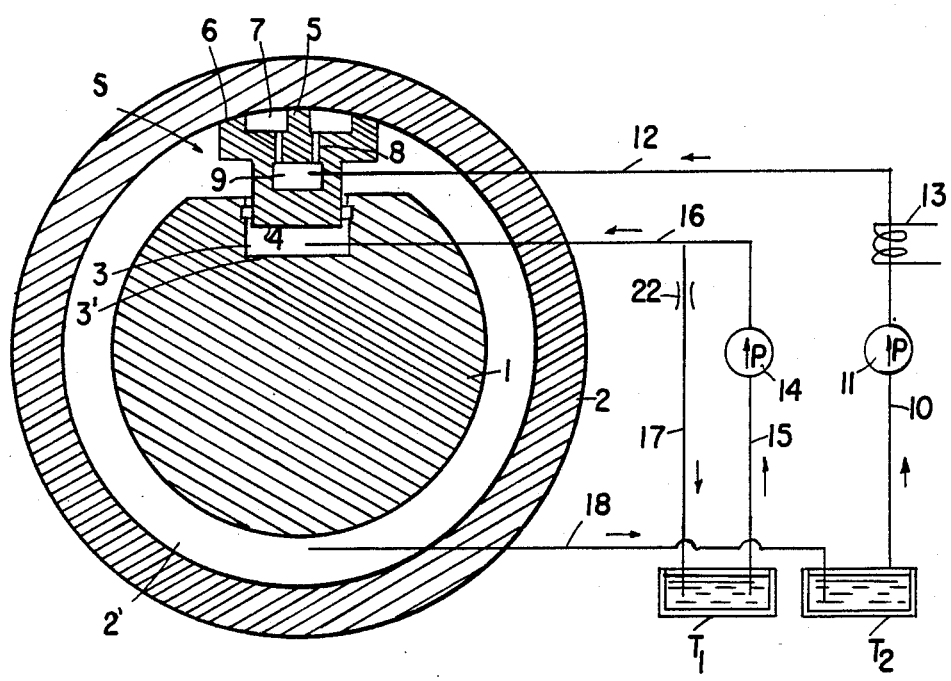
FIG. 1 is a schematic sectional view of a heatable controlled deflection roll constructed according to the invention, taken along a substantially perpendicular plane to the roll axis.

Describing now the drawings, it is to be understood that to simplify the showing thereof, only enough of the structure of the exemplary embodiments of heatable controlled deflection roll have been shown therein as is needed to enable one skilled in the art to readily understand the underlying principles and concepts of the present invention. Turning attention now specifically to FIG. 1 of the drawings, the heatable controlled deflection roll illustrated therein by way of example and not limitation, will be seen to comprise a stationary support or beam 1 and a roll shell or jacket 2 which is rotatable about the stationary support or beam 1. Boreholes or bores 3' or the like defining pressure spaces or chambers 3 are appropriately formed in the stationary support or beam 1 and a respective piston 4 or equivalent structure of a hydrostatic support or carrier or pressure element S is sealingly and inclinably or tiltably guided in each of the related boreholes or bores 3'. Each piston 4 is connected with a head part or portion structured as a bearing shoe or element 5 which possesses a bearing surface 6 provided with hydrostatic bearing or running or stabilizing pockets 7. These bearing or stabilizing pockets 7 are connected by throttle bores or throttle passages 8 with a cavity or hollow space or chamber 9 located between the piston 4 and the bearing shoe or element 5.

The supply of a hydraulic heat carrier medium to the cavity or hollow space 9 is effected by second supply means encompassing a second container or reservoir $T_2$ by means of a second pump 11, possessing a substantially constant volumetric flow, through a line or conduit 10 which leads via a supply line or conduit 12 into the cavity or hollow space 9. The hydraulic heat carrier medium is heated by means of a heating device 13, for instance an induction coil or equivalent structure, to the required higher temperature, for example, in the order of magnitude of 200° C. From the cavity or hollow space 9, the hydraulic heat carrier medium passes through the throttle bores or throttle passages 8 into the hydrostatic bearing or stabilizing pockets 7 and forms a hydrostatic mounting or support or stabilization for the rotatable roll shell or jacket 2 and simultaneously heats the rotatable roll shell or jacket 2 to the desired higher temperature. Hydraulic heat carrier medium escaping or outflowing from the hydrostatic bearing or stabilizing pockets 7 into the interior or interior space 2' of the rotable roll shell or jacket 2 is fed back via a return flow line or conduit 18 to the second container or reservoir $T_2$.

The supply of a hydraulic pressurized fluid medium, for instance a pressure oil or the like, under a predetermined pressure to the pressure space or chamber 3 is effected by first supply means encompassing a first container or reservoir $T_1$ by means of a first pump 14 and through a line or conduit 15 and via a supply line or conduit 16 which leads into the pressure space or chamber 3. In this manner, a predetermined pressing force is exerted at the respective piston 4 of the hydrostatic support or carrier or pressure element S, such pressing force being transmitted by the hydrostatic support or carrier or pressure element S to the rotatable roll shell or jacket 2. Since the first pump 14 requires a certain or predetermined flow of hydraulic pressurized fluid medium for generating the necessary pressure or predertermined pressing force, a small part or portion of the infed hydraulic pressurized fluid medium is fed back into the first container or reservoir $T_1$ via a branch return flow line or conduit 17 containing a throttle location 22 and branching off from the supply line or conduit 16.

Figure 2:
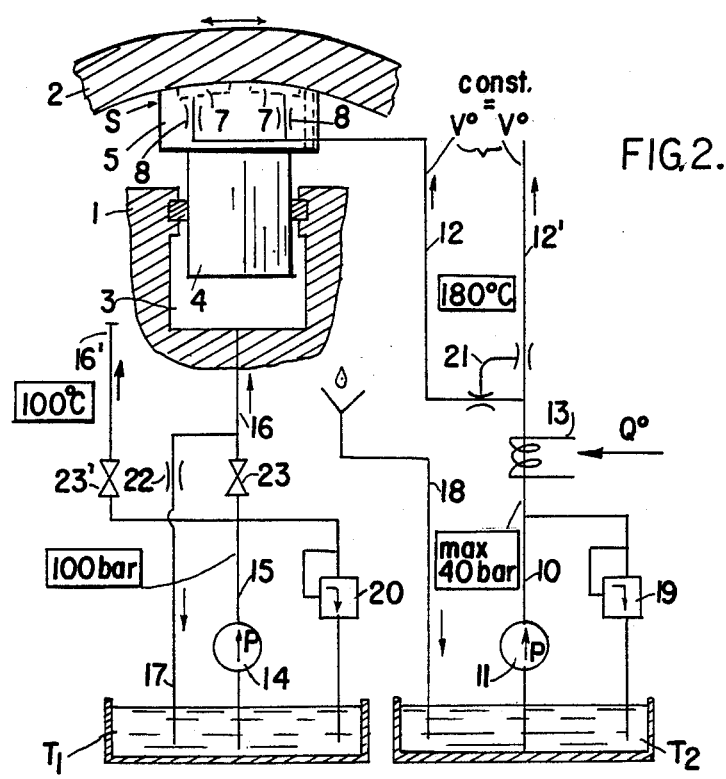
FIG. 2 shows a portion or segment of the heatable controlled deflection roll shown in FIG. 1, and a schematic illustration of supply lines or conduits leading from separate containers or reservoirs to two operationally separate hydraulic circuits.

FIG. 2 shows a portion or segment of the heatable controlled deflection roll shown in FIG. 1 and a lay-out of the supply lines or conduits including further details, wherein the same or equivalent components or parts are here conveniently designated with the same reference characters as used in the arrangement of FIG. 1. In the arrangement now under consideration the hydraulic heat carrier medium is supplied via the line or conduit 10 from the second pump 11 with a pressure of maximum 40 bar and heated by the heating device 13 to approximately 180° C. From this heating device 13, the heated hydraulic heat carrier medium passes through the supply line or conduit 12 and is delivered to the hydrostatic bearing or stabilizing pockets 7 of the hydrostatic support or pressure element S and simultaneously delivered, via branch supply lines or conduits 12' arranged parallel thereto, to further hydrostatic support or carrier or pressure elements in the same controlled deflection roll, which further hydrostatic support or carrier or pressure elements have not been shown in FIG. 2 in order to simplify the illustration. A return flow line or conduit 18 leads from the interior or interior space 2' of the rotatable roll shell or jacket 2 to the second container or reservoir $T_2$.

At the branch-off location there is provided a flow or volume divider 21 which serves to provide a uniform supply of the supply line or conduit 12 and the branch supply lines or conduits 12' with a constant volumetric flow of heated hydraulic heat carrier medium. Parallel to the second pump 11 there is provided a pressure limiting valve 19 which limits the pump pressure to a maximum permissible pressure of, for example, 40 bar. It should be noted that, in accordance with specific requirements, the hydraulic heat carrier medium also can be heated to higher temperatures up to 225° C. and even more.

For the supply of hydraulic pressurized fluid medium by the first pump 14 which operates, for example, with a pressure of approximately 100 bar, there is also provided a branch supply line or conduit 16'. In other words, the hydraulic pressure fluid medium having a temperature preferably below 100° C. is delivered via a supply line or conduit 16 and a pressure regulating valve 23 to the pressure space or chamber 3 of the hydrostatic support or pressure element S, and delivered via branch supply lines or conduits 16' and corresponding pressure regulating valves 23' to analogous pressure spaces or chambers of other hydrostatic support or carrier or pressure elements of the same controlled deflection roll. Such analogous pressure spaces or chambers of the other hydrostatic support or carrier or pressure elements have not been shown in FIG. 2 in order to simplify the illustration. For the supply line or conduit 16 and each of the branch supply lines or conduits 16', respectively, there is provided the branch return flow line or conduit 17 containing the throttle location 22. A smaller portion of the flow of hydraulic pressurized fluid medium is separated and fed back into the first container or reservoir $T_1$ in order to ensure the function of the first pump 14. Pressure limiting valve means 20 are connected parallel to the first pump 14 and limit the pump pressure to a maximum permissible pressure of, for example, 100 bar.

FIG. 3 shows a further exemplary embodiment of the controlled deflection roll constructed according to the invention and which operates with a single heat resistant hydraulic pressurized fluid medium which serves as a hydraulic pressurized fluid medium for the pressure space or chamber 3 as well as a hydraulic heat carrier medium for the hydrostatic bearing or stabilizing pockets 7. Such common or single hydraulic pressurized fluid medium is supplied from a common container or reservoir T by means of a common pump 11' and distributed through a common line or conduit 10'. The common hydraulic pressurized fluid medium is delivered, on the one hand, via the first supply line or conduit means 16 and through the pressure regulating or metering valve 23 to the pressure space or chamber 3, whereby again the return flow line or conduit 17 containing the throttle location 22 is provided. The pressure spaces or chambers of parallel hydrostatic support or pressure elements (not shown) are supplied with the common hydraulic pressure fluid medium by branch supply lines or conduits 16' containing corresponding pressure regulating or metering valves 23'.

A second or branch line or conduit means 12" leads through the heating device 13 and via the supply line or conduit 12 into the hydrostatic bearing or stabilizing pockets 7, and parallel thereto via the branch supply lines or conduits 12' into the hydrostatic bearing or stabilizing pockets of parallel hydrostatic support or pressure elements which have not been shown in the drawing in order to simplify the illustration. In the supply line or conduit 12" for the hydrostatic pressurized fluid medium heated, for example, to approximately 200° C., there is provided a check-valve 24 which cuts off the supply of hydrostatic pressurized fluid medium to the hydrostatic bearing or stabilizing pockets 7, such check-valve 24 being controlled by the rotational speed of the rotatable roll shell or jacket 2 and closing when a predetermined threshold rotational speed thereof is reached. The hydrostatic support or pressure element S initially acting as a hydrostatic mounting or bearing element operates strictly in hydrodynamic manner at rotational speeds above the aforementiond predetermined threshold rotational speed which has the inherent consequence of very low leakage of the heated hydraulic pressurized fluid medium so that there can be cut-off or closed the supply of heated hydraulic pressurized fluid medium to the hydrostatic bearing or stabilizing pockets 7. This has the added advantage that during operation of the heatable controlled deflection roll at such rotational speeds in excess of the predetermined threshold rotational speed, no heated hydraulic pressurized fluid medium has to be returned to the common container or reservoir T, so that the common hydraulic pressurized fluid medium in the common container or reservoir T remains at a lower temperature.

FIG. 4 shows a practical exemplary embodiment of a hydrostatic support or carrier or pressure element S containing separate supply lines or conduits for the hydraulic pressure fluid medium and the hydraulic heat carrier medium, respectively. In the stationary support or beam 1 there is provided a cylinder borehole or bore serving as the pressure space or chamber 3 in which the piston 4 of the hydrostatic support or pressure element S is sealingly guided in the radial direction of the rotatable roll shell or jacket 2, i.e. in the support or pressing direction. In the stationary support or beam 1 there are also provided the supply lines or conduits 12 and 16 which lead into the inner part or portion of the pressure space or chamber 3. In the center of the piston 4 of the hydrostatic support or pressure element S there is provided a further cylinder borehole or bore which defines the cavity or hollow space or chamber 9 and opens to the pressure space or chamber 3 at the end thereof which is opposite the supply line or conduit 12.

Between this central cavity or hollow space or chamber 9 in the piston 4 of the hydrostatic support or pressure element S and the central or concentric supply line or conduit 12 there is provided a substantially tubular-shaped connecting piece or tube 25 which spans the pressure space or chamber 3 and is slidably sealed against the cylindrical inner walls of the cavity or hollow space or chamber 9 and the supply line or conduit 12 by means of flange-shaped seals 26 and 27. In this manner, the inner part or portion of the cavity or hollow space or chamber 9 and the supply line or conduit 12 are separated from the pressure space or chamber 3. The pressure space or chamber 3 can thus be supplied via the supply line or conduit 16 with a hydraulic pressurized fluid medium having a constant volumetric flow, whereas a hydraulic heat carrier medium having a higher temperature is delivered to the hydrostatic bearing or stabilizing pocket 7 via the supply line or conduit 12, the tubular-shaped connecting piece or tube 25, the cavity or hollow space or chamber 9 and throttle lines or conduits 28.

FIG. 5 shows a further exemplary embodiment of a hydrostatic support or carrier or pressure element S provided with a mechanically inverse arrangement of the pressure space or chamber 3 located in a central cylindrical borehole or bore of the bearing shoe or element 5 of the hydrostatic support or pressure element S which is provided with hydrostatic bearing or stabilizing pockets 7 at the bearing surface 6 thereof. At the stationary support or beam 1 there is mounted, for instance welded or threaded thereto, a cylindrical head piece or attachment 30 which is provided with a central borehole or bore 29 to which the supply line or conduit 12 of the hydraulic heat carrier medium is connected. The bearing shoe or element 5 is sealingly and displaceably guided in the radial direction upon the head piece or attachment 30 by means of the central cylindrical borehole or bore of the bearing shoe or element 5, which cylindrical borehole or bore is actually the pressure space or chamber 3.

Furthermore, in the head piece or attachment 30 there is provided an eccentrically arranged bore 31 for infeeding the hydraulic pressurized fluid medium via the supply line or conduit 16 to the pressure space or chamber 3. In the center of the bearing shoe or element 5 there is provided a sleeve 32 which spans the pressure space or chamber 3 and is dimensioned such that it is sealingly displaceable within the central borehole or bore 29 of the head piece or attachment 30. Through this sleeve 32, the hydraulic heat carrier medium can be supplied to the hydrostatic bearing or stabilizing pocket 7 from the central borehole or bore 29 of the head piece or attachment 30 and via the throttle bores or passage 8.

FIG. 6 shows an exemplary embodiment of the supply of hydrostatic pressurized fluid medium at a hydrostatic support or carrier or pressure element S in which there is no connection between the hydrostatic bearing or stabilizing pockets 7 and the pressure space or chamber 3. The hydraulic heat carrier medium is delivered to the hydrostatic bearing or stabilizing pockets 7 via the cavity or hollow space or chamber 9 located in the hydrostatic support or pressure element S. In the stationary support or beam 1 there are provided a number of bores 33 through which the hydraulic pressurized fluid medium is supplied to the individual pressure spaces or chambers of the hydrostatic support or carrier element S. The individual pressure spaces or chambers 3 can be thereby separately controlled by hydraulic pressurized fluid medium of different pressure, in order to individually control in analogous manner the pressing force of the associated hydrostatic support or pressure elements S. Via a further line or conduit 34 located in the stationary support or beam 1, the hydraulic heat carrier medium is laterally supplied to the bearing shoe or element 5 of the hydrostatic support or pressure element S via a flexible connecting line or conduit 35 and fed into the cavity or hollow space or chamber 9 from where the hydraulic heat carrier medium flows into the hydrostatic bearing or stabilizing pockets 7.

FIG. 7 illustrates the distribution of the hydraulic heat carrier medium to a row of hydrostatic support or carrier or pressure elements $S_1$, $S_2$ and $S_3$ via the single line or conduit 34 in the stationary support or beam 1. From this single line or conduit 34 the hydraulic heat carrier medium is supplied via the flexible connecting line or conduit 35 to a cross-connecting line or conduit 36 which connects the cavities or hollow spaces or chambers $9^1$, $9^2$ and $9^3$ of the individual hydrostatic support or pressure elements $S_1$, $S_2$ and $S_3$. The hydraulic heat carrier medium then flows into the hydrostatic bearing or stabilizing pockets $7^1$, $7^2$, $7^3$ and $7^4$ provided at each hydrostatic support or pressure element S. The cross-connecting lines or conduits 36 between the hydrostatic support or pressure elements S are likewise structured to be flexible and, in addition, stabilize the hydrostatic support or pressure elements S against twisting or warping. Such an arrangement is particularly advantageous when the individual hydrostatic support or pressure elements S are provided with a hydraulic heat carrier medium of the same pressure and the same temperature. On the other hand, such hydrostatic support or pressure elements S can be acted upon with hydraulic pressurized fluid medium of different pressure, so that the pressing force of the individual hydrostatic support or pressure elements S is individually adjustable and controllable.

The heating device 13 for the hydraulic heat carrier medium can be provided exterior of the controlled deflection roll and structured as a superheated steam heating, an electric heating or as induction coils or the like, particularly when a uniform temperature throughout the controlled deflection roll is acceptable. On the other hand, the heating device 13 can be also provided within or at the interior of the controlled deflection roll. This is advantageous when a hydraulic heat carrier medium having an individually adjustable temperature is desired or required at the individual hydrostatic support or carrier or pressure elements S.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A heatable controlled deflection roll, comprising:
a stationary support;
a roll shell rotatable about said stationary support;
said rotatable roll shell defining an interior space;
at least one hydrostatic support element;
said rotatable roll shell being supported in relation to said stationary support by means of said at least one hydrostatic support element;
at least one pressure chamber;
supply means for infeeding a hydraulic pressurized fluid medium to said at least one hydrostatic support element;
return flow means for returning hydraulic pressurized fluid medium issuing from said at least one hydrostatic support element, from said interior space of said rotatable roll shell to said supply means;
said at least one hydrostatic support element being mounted in said at least one pressure chamber to be displaceable in a radial direction with respect to said stationary support;
said rotatable roll shell having an inner side;

said at least one hydrostatic support element possessing a running surface which faces said inner side of said rotatable roll shell;

said running surface being provided with at least one bearing pocket;

first conduit means interconnecting said supply means for infeeding said hydraulic pressurized fluid medium and said at least one pressure chamber of said at least one hydrostatic support element for generating and transmitting a predetermined pressing force to said rotatable roll shell;

second conduit means interconnecting said supply means for infeeding said hydraulic pressurized fluid medium and said at least one bearing pocket in said running surface of said at least one hydrostaitgc support element;

heating means connected with said second conduit means for heating said hydraulic pressurized fluid medium fed to said at least one bearing pocket in said running surface of said at least one hydrostatic support element;

said hydraulic pressurized fluid medium having a predetermined operating temperature;

said heating means being provided for heating said hydraulic pressurized fluid medium in said second conduit means to a temperature which is higher than said predetermined operating temperature of said hydraulic pressurized fluid medium;

said first conduit means and said second conduit means respectively maintaining the flow of said hydraulic pressurized fluid medium separate from the flow of said heated hydraulic pressurized fluid medium in order to thereby at least minimize heating said hydraulic pressurized fluid medium above said predetermined operating temperature by preventing the admixing of the heated hydraulic pressurized fluid medium with the hydraulic pressurized fluid medium;

said supply means for infeeding said hydraulic pressurized fluid medium comprise:

common container means containing a hydraulic fluid medium; and a common pump means for feeding said hydraulic pressurized fluid medium from said common container means to said first conduit means and said second conduit means;

said return flow means interconnecting said interior space of said rotatable roll shell and said common container means;

pressure regulating valve means incorporated into said first conduit means;

said second conduit means being connected to said common pump device;

controlled valve means incorporated into said second conduit means;

said controlled valve means contain check-valve means arranged at said second conduit means for supplying said hydraulic pressurized fluid medium via said heating means to said at least one bearing pocket;

said rotatable roll shell assuming, during operation of the heatable controlled deflection roll, rotational speeds below and above a predetermined threshold rotational speed;

said at least one hydrostatic support element supporting said rotational roll shell substantially in hydrodynamic manner at rotational speeds above said predetermined threshold rotational speed; and said check-valve means serving to shut off the flow of said hydraulic pressurized fluid medium via said heating means to said at least one bearing pocket as soon as the rotational speed of said rotatable roll shell exceeds said predetermined threshold rotational speed.

2. A heatable controlled deflection roll, comprising:

a stationary support;

a roll shell rotatable about said stationary support;

said rotatable roll shell defining an interior space;

at least one hydrostatic support element;

said rotatable roll shell being supported in relation to said stationary support by means of said at least one hydrostatic support element;

at least one pressure chamber;

supply means for infeeding a hydraulic pressurized fluid medium to said at least one hydrostatic support element;

return flow means for returning hydraulic pressurized fluid medium issuing from said at least one hydrostatic support element, from said interior space of said rotatable roll shell to said supply means;

said at least one hydrostatic support element being mounted in said at least one pressure chamber to be displaceable in a radial direction with respect to said stationary support;

said rotatable roll shell having an inner side;

said at least one hydrostatic support element possessing a running surface which faces said inner side of said rotatable roll shell;

said running surface being provided with at least one bearing pocket;

first conduit means interconnecting said supply means for infeeding said hydraulic pressurized fluid medium and said at least one pressure chamber of said at least one hydrostatic support element for generating and transmitting a predetermined pressing force to said rotatable roll shell;

second conduit means interconnecting said supply means for infeeding said hydraulic pressurized fluid medium and said at least one bearing pocket in said running surface of said at least one hydrostatic support element;

heating means connected with said second conduit means for heating said hydraulic pressurized fluid medium fed to said at least one bearing pocket in said running surface of said at least one hydrostatic support element;

said hydraulic pressurized fluid medium having a predetermined operating temperature;

said heating means being provided for heating said hydraulic pressurized fluid medium in said second conduit means to a temperature which is higher than said predetermined operating temperature of said hydraulic pressurized fluid medium;

said first conduit means and said second conduit means respectively maintaining the flow of said hydraulic pressurized fluid medium separate from the flow of said heated hydraulic pressurized fluid medium in order to thereby at least minimize heating said hydraulic pressurized fluid medium above said predetermined operating temperature by preventing the admixing of the heated hydraulic pressurized fluid medium with the hydraulic pressurized fluid medium;

said first conduit means for infeeding said hydraulic pressurized fluid medium and said second conduit means for infeeding said heated hydraulic pressurized fluid medium comprise separate conduit means provided in said stationary support;

a displaceable substantially tubular-shaped sleeve provided between said at least one hydrostatic support element and said other one of said separate conduit means for infeeding said heated hydraulic pressurized fluid medium;

said displaceable substantially tubular-shaped sleeve having an inner space;

said displaceable substantially tubular-shaped sleeve spanning said at least one pressure chamber and said inner space of said displaceable substantially tubular-shaped sleeve being sealed with respect to said at least one pressure chamber; and said heated hydraulic pressurized fluid medium traversing said at least one pressure chamber by means of said substantially tubular-shaped sleeve and being fed to said at least one bearing pocket without contact with said at least one pressure chamber.

* * * * *